US006826715B1

United States Patent
Meyer et al.

(10) Patent No.: US 6,826,715 B1
(45) Date of Patent: Nov. 30, 2004

(54) AUTOMATIC CAPTURE AND COMPARISON OF COMPUTER CONFIGURATION DATA

(75) Inventors: John E. Meyer, Spring, TX (US); John S. Harsany, Houston, TX (US); Tim J. Lyons, Cypress, TX (US); David E. Gorman, Irvine, CA (US); Hung K. Dinh, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/429,226

(22) Filed: Oct. 28, 1999

(51) Int. Cl.[7] .............................................. G06F 11/30
(52) U.S. Cl. .............................. 714/37; 714/36; 713/1; 713/100
(58) Field of Search ............................ 714/37, 36, 27, 714/46; 713/1, 100

(56) References Cited

U.S. PATENT DOCUMENTS

| 5,193,174 | A | * | 3/1993 | Bealkowski et al. ........ 710/104 |
| 5,455,933 | A | | 10/1995 | Schieve et al. |
| 5,745,669 | A | * | 4/1998 | Hugard et al. ................. 714/3 |
| 5,748,877 | A | | 5/1998 | Dollahite et al. |
| 5,758,071 | A | * | 5/1998 | Burgess et al. ............. 709/220 |
| 5,854,828 | A | | 12/1998 | Kocis et al. |
| 5,974,254 | A | * | 10/1999 | Hsu ........................... 717/109 |
| 6,240,511 | B1 | * | 5/2001 | Blumenau et al. ............. 713/1 |
| 6,301,612 | B1 | * | 10/2001 | Selitrennikoff et al. ..... 709/220 |
| 6,601,190 | B1 | * | 7/2003 | Meyer et al. ................. 714/37 |

* cited by examiner

Primary Examiner—Scott Baderman

(57) ABSTRACT

A method of customer service that uses a program which captures the computer's hardware and operating system configuration when the program is installed, and also captures the hardware and operating system configuration upon request (when the user needs customer service help), and compares the two, highlighting differences.

22 Claims, 3 Drawing Sheets

FIG.2

Compaq Diagnostics System Record

System Record | About

Base.log

```
DIMM Slot  2 . . . . . . . . . .   16
tal Compaq Memory . . . . . . . .   32 ndows Memory Information
Total Physical Memory . . . . . .  330
Free Physical Memory  . . . . . .   4 K
Total Virtual Memory  . . . . . .  214
Free Virtual Memory . . . . . . .  209 ndows
ndows Version . . . . . . . . . .   98
vision  . . . . . . . . . . . . .  4.1
ild . . . . . . . . . . . . . . .  677
```

Now.log

```
DIMM Slot  2 . . . . . . . . . .       16 M
tal Compaq Memory . . . . . . . .      32 M ndows Memory Information
Total Physical Memory . . . . . .     33050
Free Physical Memory  . . . . . .     4 Kbyt
Total Virtual Memory  . . . . . .    214328
Free Virtual Memory . . . . . . .    209068 ndows
ndows Version . . . . . . . . . .        98
vision  . . . . . . . . . . . . .       4.10
ild . . . . . . . . . . . . . . .     677662
```

*COMPAQ*
Diagnostics System Record

OK | Cancel

AUTOMATIC CAPTURE AND COMPARISON OF COMPUTER CONFIGURATION DATA

The present application relates to diagnosis and service of computer faults.

BACKGROUND AND SUMMARY OF THE INVENTION

In recent decades, computers have become integral tools for information processing. Businesses and individuals rely on commercially available PCs for many purposes. To be competitive, companies provide extensive customer support for the machines they sell and expend considerable resources on diagnosis and repair of computers.

A large number of service calls deal with problems created by recent changes in software and hardware configurations on the computer. Identifying recent configuration changes helps diagnose computer faults. Many different problems can arise during the use of computer software and hardware, so customer service needs detailed information about the specific hardware and operating system configurations from the computer to resolve problems.

Service personnel can gather the information they need by going to the actual site of the computer. This is expensive and usually not cost effective. More often, service personnel gather the information they need directly from the customer over the telephone. This solution is not ideal, because problems with the operation of computers may often be complex, and users do not always know what information service personnel need to resolve the service call.

This problem can be partially addressed by installing a diagnostics program on the customer's computer (e.g., Compaq Diagnostics for Windows) that locally collects hardware and operating system information from the computer. The customer verbally provides this information to customer service during a service call.

Automatic Capture and Comparison of Computer Configuration Data

The information yielded by diagnostics programs does not identify recent configuration changes in the hardware and software. Since recent configuration changes are often the source of a computer problem, there is need for a way to generate comprehensive configuration snapshots which identify configuration changes for service personnel to use during a service call.

The present application teaches, among many things, an improved method of servicing and diagnosing computers. Computer service tools require on-line functionality to identify and resolve problems without taking the computer off-line, and a simple collection process for gathering the computer information required to effectively resolve service cases. This invention provides a simplified process of capturing comprehensive information about the computer hardware and operating system and compares previous configurations with current configurations to help identify recent changes.

A diagnostics program captures hardware and operating system configurations when the program is installed on the computer. Later, when a computer owner calls customer service with a problem, the computer owner runs the diagnostic program, which captures the current hardware and operating system configurations. The program performs this capture without the need to restart the computer or take it off-line. The original configuration settings (captured when the program was installed) serve as a baseline for comparison to the current configuration. The program output highlights any significant changes that have occurred in the configurations and automatically updates the output file to reflect the latest configuration and differences relative to the baseline. Once this information is gathered, customer service uses it to assist in servicing the customer's computer.

By automatically performing on-line hardware and operating system information capture and displaying differences between base line and current configurations, the invention provides many advantages. It allows faster problem resolution time, since essential data is gathered and output in a format that highlights the most likely problem spots. This reduces administration costs and resource expenditure in customer service and diagnostics, while maintaining or improving quality of service to the customer. Computer downtime for the customer is also reduced since service calls are resolved more quickly.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 2 shows a sample display window that the customer will see when the diagnostic is run.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
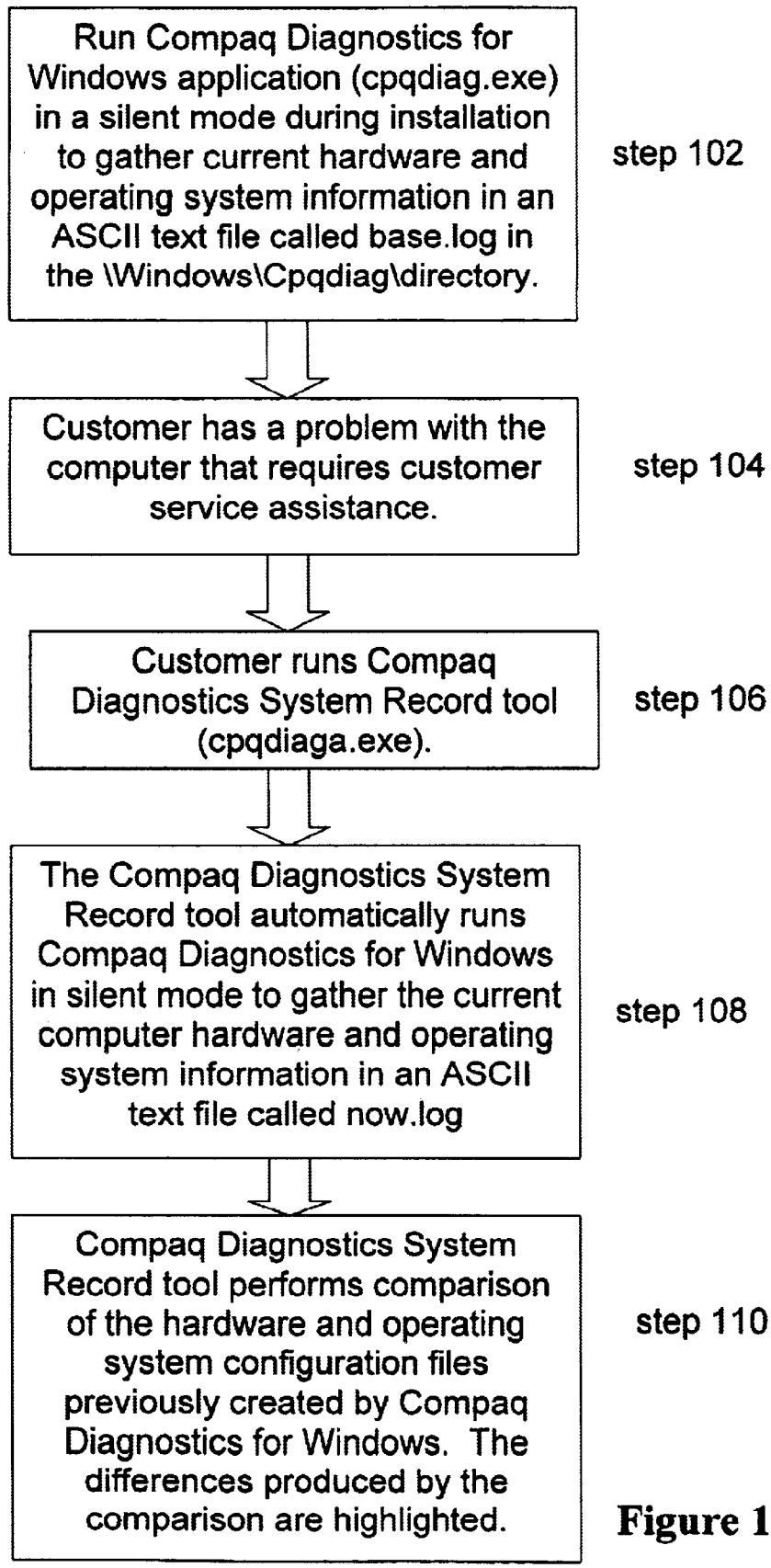
FIG. 1 shows a flowchart of the diagnostic process using the present innovations.

FIG. 1 shows a flow chart of the innovative process. First the program is installed and run (cpqdiag.exe) in a silent mode during installation to gather the base line computer hardware and operating system information in an ASCII text file called base.log. This file is stored in the \Windows\Cpqdiag\ directory (step 102). Later, the customer has a computer problem that requires customer service assistance (step 104). The customer then runs Compaq Diagnostics System Record tool (cpqdiaga.exe) (step 106). The Compaq Diagnostics System Record tool automatically runs Compaq Diagnostics for Windows in silent mode to gather the current computer hardware and operating system information in an ASCII text file called now.log (step 108). In the preferred embodiment, this data gathering is done without the need to restart the computer or take the computer off-line, because operating system level diagnostics are used. The invention could be implemented with embedded diagnostics as well.

The Compaq Diagnostics System Record tool compares the hardware and operating system configuration files (base.log and now.log) previously created by Compaq Diagnostics for Windows. The differences produced by the comparison are highlighted (step 110).

The output is displayed on the customer's screen in a bifurcated window showing base line configurations on one side, the current configurations on the other. FIG. 2 shows a sample display window, with the base.log data on the left and now.log data on the right. The "free physical memory" configuration settings, 202 and 204, differ and are therefore highlighted in the output.

Figure 3:
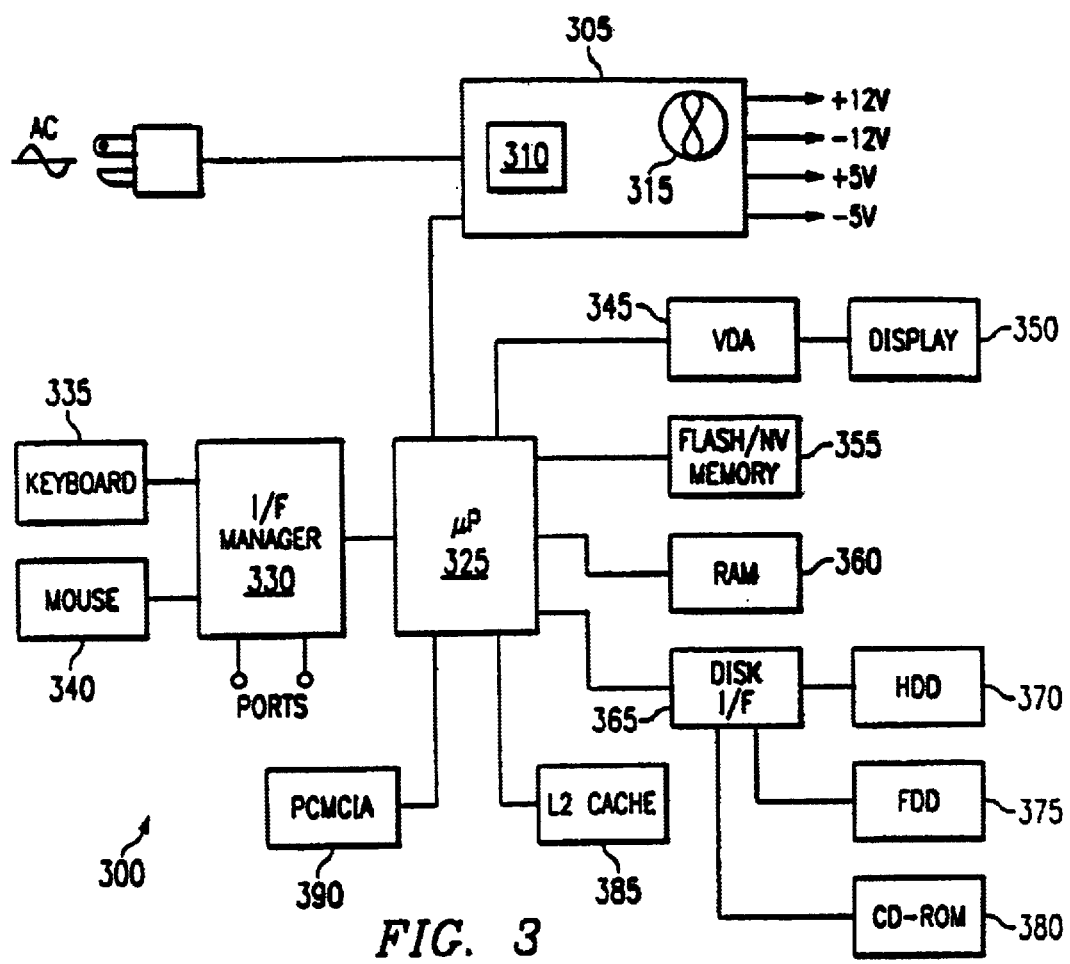
FIG. 3 shows a computer according to the presently preferred embodiment.

FIG. 3 shows a block diagram of a computer system 300 according to the presently preferred embodiment. In this example, the computer system, includes:

- user input devices (e.g. keyboard 335 and mouse 340);
- at least one microprocessor 325 which is operatively connected to receive inputs from said input device, through an interface manager chip 330 (which also provides an interface to the various ports);
- a power supply 305 which is connected to draw power from AC mains and provide DC voltage to the computer system 300 components; the innovative power supply control circuit 310, located within the power supply 305, connects to fan 100 and also interfaces to the microprocessor 325;
- a memory (e.g. flash or non-volatile memory 355 and RAM 360), which is accessible by the microprocessor;
- a data output device (e.g. display 350 and video display adapter card 345) which is connected to output data generated by microprocessor; and
- a magnetic disk drive 370 which is read-write accessible, through an interface unit 365, by the microprocessor.

Optionally, of course, many other components can be included, and this configuration is not definitive by any means. For example, the computer may also include a CD-ROM drive 380 and floppy disk drive ("FDD") 375 which may interface to the disk interface controller 365. Additionally, L2 cache 385 may be added to speed data access from the disk drives to the microprocessor, and a PCMCIA 390 slot accommodates peripheral enhancements.

Comprehensive data is gathered in the ASCII text files (base.log and now.log) in steps 102 and 108 relating to the hardware and operating system configurations. The attached output offers a sample file format for the base.log and now.log output files. The information gathered in these files relates to the system itself, asset control, input devices, communication, storage, video, memory, multimedia, the operating system, architecture, computer health, and various miscellaneous data.

The system data displayed includes the date and time, the name of the computer product, a machine ID, processor statistics, and system ROM information.

Asset control output includes the product name, which processor is used, and an asset tag.

Input devices output includes information on the keyboard and the mouse.

Communication output displays data for the various ports.

Storage data includes logical drive information and physical drive information.

Video output includes the current graphics resolution, the primary monitor attached, video display driver, and the video controller ROM.

Memory output includes the system board, total memory, and windows memory information.

Multimedia output includes data about the CDROM, the mixer device driver capabilities, the waveform output device driver capabilities, waveform input device driver capabilities, MIDI input and output device driver capabilities, and auxiliary audio device driver capabilities.

Windows output includes which version of Windows is in use, the locations of directories, and Windows memory information.

Architecture output includes PCI device information, and whether the system has PCMCIA capabilities.

Health output includes the temperature, and whether the ROM has embedded diagnostics.

Some of the miscellaneous output information deals with when the system was last modified, BIOS data, system configuration memory, interrupt vector table, a power conversion record, system standby timeout record, screen saver record, hard drive timeout record, security features record, processor/memory/cache record, general system peripheral and input device information record, memory module information record, timeout default value record, extended disk support record, and a product name header record.

Sample Now.log/Base.log File Format

| Compaq Diagnostics for Windows 2.11 | |
|---|---|
| System | |
| Date | 9/8/98 |
| Time | 10:07:40 AM |
| Product | Armada 7792DM |
| Machine ID From System Board | 2BC |
| Processor | Pentium(R) w/ MMX at 266 MHz |
| CPU ID | 0581 |
| Numeric Coprocessor | Integrated 387-Compatible |
| Secondary Cache | Installed |
| Size | 512 Kbytes |
| Write policy | Write back |
| Optional | Optional/Permanent |
| Asset tag | 7804BS521071 |
| Current System Speed | High |
| System ROM | |
| Revision | 3/20/98 |
| Family | 586S |
| Flashable | Yes |
| Socketed | No |
| Video Controller ROM | |
| Revision | 12/15/97 |
| Does ROM support F10 partition | Yes |
| Backup copy of CMOS supported | No |

-continued

| Compaq Diagnostics for Windows 2.11 | |
|---|---|
| Does ROM have embedded diagnostics | No |

Armada 7792DM is a trademark of Compaq Computer Corporation.

AssetControl

| | |
|---|---|
| Product | Armada 7792DM |
| Processor | Pentium(R) w/ MMX at 266 MHz |
| Asset tag | 7804BS521071 |
| System board revision level | |
| Assembly Version | 1 |
| Functional Revision Level | A |

Input Devices

| | |
|---|---|
| Keyboard | |
| Type | (101- or 102-key) IBM enhanced/compatible |
| Number of function keys | 12 |
| Speed | 15 ms |
| Delay | 0 ms |
| Mouse | |
| Type | Standard PS/2 Port Mouse |
| Speed | 1 |
| Double click time | 500 ms |
| Buttons swapped | No |

Communication

| | |
|---|---|
| LPT Ports | LPT 1 (Address 0x0378) |
| COM Ports | COM 1 (Address 0x03F8) |
| | COM 2 (Address 0x02F8) |
| | COM 3 (Address 0x03E8) |
| Modem | Compaq SpeedPaq 33.6 Fax |
| Baud | 33600 |
| Port | COM2 |
| Variant | United States |
| Firmware | 1.22 |

Storage

| | |
|---|---|
| Logical Drive Information | |
| C: Hard Drive | 1.996 GB (59 MB Free) |
| D: Hard Drive | 1.996 GB (228 MB Free) |
| E: Hard Drive | 760 (240 MB Free) |
| F: CD-ROM Drive | |
| H: Remote/Network Drive | |
| I: Remote/Network Drive | |
| K: Remote/Network Drive | |
| L: Remote/Network Drive | |
| N: Remote/Network Drive | |
| Q: Remote/Network Drive | |
| S: Remote/Network Drive (Drive_E) | |
| U: Remote/Network Drive | |
| Physical Drive Information | |
| IBM-DPLA-25120 Hard Drive | |
| Capacity | 5124 MB |
| Serial Number | D34D31L5589 |
| Firmware Revision | PL8OAB1A |
| Interface | IDE |
| Controller | Primary |
| Position | Master |
| Compaq Fibre Channel Tape Controller | |
| Firmware Revision | y |
| Devices Attached | 0 |
| COMPAQ CRD-S311 CDROM | |
| Firmware Revision | 1.05 |
| Adapter | 0 |
| Target | 1 |
| Lun | 0 |

Video

| | |
|---|---|
| Current graphics resolution | 1024 × 768 |
| Primary Monitor attached to | S3 Aurora64V+ Graphics Controller |
| Video device driver(s) | |
| DISPLAY.DRV=pnpdrvr.drv | |
| 386GRABBER=vgafull.3gr | |
| Date and Time | 8/24/96, 11:11:10 AM |
| Size | 14624 Bytes |
| Company Name | Microsoft Corporation |
| Product Name (Driver) | Microsoft ® Windows ® Operating System |
| Product Version | 4.00.950 |
| File Description | Combined VGA/DIB 386 enhanced mode display component |

-continued

| Compaq Diagnostics for Windows 2.11 | |
|---|---|
| File Version | 4.00.950 |
| Internal Name | GRABBER |
| Original Filename | VGAFULL.3GR |
| Design operating system | DOS-Win16 |
| Display Panel Type | 4 |
| Video Controller ROM Revision | 12/15/97 |
| Memory | |
| System Board | 16 Megabytes |
| DIMM Slot 1 | 0 Megabytes |
| DIMM Slot 2 | 16 Megabytes |
| Total Compaq Memory | 32 Megabytes |
| Windows Memory Information | |
| Total Physical Memory | 33054 Kbytes |
| Free Physical Memory | 0 Kbytes |
| Total Virtual Memory | 2143289 Kbytes |
| Free Virtual Memory | 2053373 Kbytes |
| Multimedia | |
| COMPAQ CRD-S311 CDROM | |
| Firmware Revision | 1.05 |
| Adapter | 0 |
| Target | 1 |
| Lun | 0 |
| Mixer device driver(s) capabilities (see Compaq for technical support) | |
| Product Name (Driver) | ESS AudioDrive Mixer (220) |
| Company Name | ESS Technology |
| Product Identifier | 39 |
| Driver Version | 4.4 |
| Destination Lines | 3 |
| Waveform Output device driver(s) capabilities (see Compaq for technical support) | |
| Product Name (Driver) | ESS AudioDrive Playback (220) |
| Company Name | ESS Technology |
| Product Identifier | 37 |
| Driver Version | 4.4 |
| Pitch Control | Not Supported |
| Playback Rate Control | Not Supported |
| Volume Control | Separate left and right control |
| Output Format | Stereo |
| Formats Supported | 11.025 kHz, 8-bit, Mono |
| | 11.025 kHz, 8-bit, Stereo |
| | 11.025 kHz, 16-bit, Mono |
| | 11.025 kHz, 16-bit, Stereo |
| | 22.050 kHz, 8-bit, Mono |
| | 22.050 kHz, 8-bit, Stereo |
| | 22.050 kHz, 16-bit, Mono |
| | 22.050 kHz, 16-bit, Stereo |
| | 44.100 kHz, 8-bit, Mono |
| | 44.100 kHz, 8-bit, Stereo |
| | 44.100 kHz, 16-bit, Mono |
| | 44.100 kHz, 16-bit, Stereo |
| Waveform Output device driver(s) capabilities (see Compaq for technical support) | |
| Product Name (Driver) | Compaq Portable Wave #00 Line |
| Company Name | Compaq Computer Corporation |
| Product Identifier | 11 |
| Driver Version | 0.1 |
| Output Format | Monaural |
| Waveform Input device driver(s) capabilities (see Compaq for technical support) | |
| Product Name (Driver) | ESS AudioDrive Record (220) |
| Company Name | ESS Technology |
| Product Identifier | 38 |
| Driver Version | 4.4 |
| Input Format | Stereo |
| Formats Supported | 11.025 kHz, 8-bit, Mono |
| | 11.025 kHz, 8-bit, Stereo |
| | 11.025 kHz, 16-bit, Mono |
| | 11.025 kHz, 16-bit, Stereo |
| | 22.050 kHz, 8-bit, Mono |
| | 22.050 kHz, 8-bit, Stereo |
| | 22.050 kHz, 16-bit, Mono |
| | 22.050 kHz, 16-bit, Stereo |
| | 44.100 kHz, 8-bit, Mono |
| | 44.100 kHz, 8-bit, Stereo |
| | 44.100 kHz, 16-bit, Mono |
| | 44.100 kHz, 16-bit, Stereo |
| Waveform Input device driver(s) capabilities (see Compaq for technical support) | |
| Product Name (Driver) | Compaq Portable Wave #00 Line |

-continued

| Compaq Diagnostics for Windows 2.11 | |
|---|---|
| Company Name | Compaq Computer Corporation |
| Product Identifier | 10 |
| Driver Version | 0.1 |
| Input Format | Monaural |
| MIDI Output device driver(s) capabilities (see Compaq for technical support) | |
| Product Name (Driver) | ESFM Synthesis (220) |
| Company Name | ESS Technology |
| Audio Source | FM Synthesizer |
| Product Identifier | 4 |
| Driver Version | 4.4 |
| Volume Control | Supported |
| Voices supported | 18 |
| Simultaneous notes supported | 18 |
| MIDI Output device driver(s) capabilities (see Compaq for technical support) | |
| Product Name (Driver) | ESS MPU-401 |
| Company Name | ESS Technology |
| Audio Source | MIDI Hardware Port |
| Product Identifier | 9 |
| Driver Version | 4.4 |
| Volume Control | Supported |
| MIDI Input device driver(s) capabilities (see Compaq for technical support) | |
| Product Name (Driver) | ESS MPU-401 |
| Company Name | ESS Technology |
| Product Identifier | 10 |
| Driver Version | 4.4 |
| Auxiliary Audio device driver(s) capabilities (see Compaq for technical support) | |
| Product Name (Driver) | ESS AudioDrive Line-In (220) |
| Company Name | ESS Technology |
| Audio Source | Auxiliary Input Jacks |
| Product Identifier | 3 |
| Driver Version | 4.4 |
| Volume Control | Separate left and right control |
| Product Name (Driver) | ESS AudioDrive CD-Audio (220) |
| Company Name | ESS Technology |
| Product Identifier | 8 |
| Driver Version | 4.4 |
| Volume Control | Separate left and right control |
| Windows | |
| Windows Version | 95 |
| Revision | 4.0 |
| Build | 67109975 |
| Windows directory | C:\WINDOWS |
| Windows system directory | C:\WINDOWS\SYSTEM |
| Windows Memory Information | |
| Total Physical Memory | 33054 Kbytes |
| Free Physical Memory | 0 Kbytes |
| Total Virtual Memory | 2143289 Kbytes |
| Free Virtual Memory | 2053373 Kbytes |
| Architecture | |
| PCI Devices Information | |
| Signature | PCI |
| Config Mechanism #1 | Supported |
| Config Mechanism #2 | Not Supported |
| Spec Cycle for Config #1 | Supported |
| Spec Cycle for Config #2 | Not Supported |
| BIOS Interface Version | 2.10 |
| Last PCI Bus Number | 0 |
| Number of PCI Devices | 2 |
| Bus Number | 0 |
| Device Number | 13 |
| Function Number | 0 |
| Slot Number | 0 |
| Vendor ID | 5333h |
| Device ID | 8812h |
| Revision ID | 43h |
| Device Type | VGA Compatible Controller |
| Programming Interface | 0 |
| Expansion ROM Base Address | FFFF0000h |
| IRQ Line | 11 |
| IRQ Pin | INTA# |
| Memory Address Base | 40000000h |
| Memory Address Length | 4000000h |
| Bus Number | 0 |
| Device Number | 14 |
| Function Number | 1 |

-continued

| Compaq Diagnostics for Windows 2.11 | |
|---|---|
| Slot Number | 0 |
| Vendor ID | E11h |
| Device ID | AE33h |
| Revision ID | 3h |
| Device Type | IDE Controller |
| Programming Interface | 234 |
| Expansion ROM Base Address | 0h |
| IRQ Line | 14 |
| IRQ Pin | INTA# |
| IO Address Base | 0h |
| IO Address Length | 8h |
| IO Address Base | 0h |
| IO Address Length | 4h |
| IO Address Base | 0h |
| IO Address Length | 4h |
| Does system have PCMCIA capabilities | Yes |
| Health | |
| Temperature | Normal |
| Does ROM have embedded diagnostics | No |
| Miscellaneous | |

\*\*\*\*\* Dump of C:\SYSTEM.SAV\INFO.BOM (4242 Bytes) \*\*\*\*\*
\*\*\*\*\* Last modified on: 1/31/97, 0:00:00 AM \*\*\*\*\*
SKU Number:     315650-001
[Info]
SkuNumber=315650-001 Rev 100
BomID=50000 Rev 1
[Zips]
File1=138782-00A Rev 2, 12 MB System - 2.0 Gb Primary - 2.0 Gb Secondary - 0 Mb
File2=138701-00A Rev 33, QTR Star Startup [XXXXX XX] Ver 1.00 Rev 1 Ext 1 Int 2
File3=138703-00A Rev 31, Windows 95 OSR2 [WIN40 US] Ver 4.00 Rev 2 Ext 1 Int 1
File4=138740-00A Rev 43, Star T Config [WIN40 US] Ver 1.00 Rev 1 Ext 3 Int 1
File5=138757-00A Rev 31, Dynamic Floppy QFE [WIN40 US] Ver 4.00.1112 Rev 1 Ext 2 Int 1
File6=138747-00A Rev 32, Universal Serial Bus SR2 [WIN40 US] Ver 1.00 Rev 1 Ext 1 Int 2
File7=138745-00A Rev 32, MS DirectX Drivers [WIN40 US] Ver 3.0A Rev 2 Ext 1 Int 2
File8=138758-00A Rev 42, Windows 95 CONFIG [WIN40 XX] Ver 2.00 Rev 1 Ext 2 Int 7
File9=\US\WIN40\PWR95_B1.EXE, 138751-00A Rev 32, Power Management Win95 [WIN40 US] Ver 2.01 Rev 2 Ext 1 Int 1
File10=\US\SEC32_C2.EXE, 138737-00A Rev 34, Security 32, Win95 [WIN40 US] Ver 1.10 Rev 3 Ext 2 Int 1
File11=\GLOBAL\WIN40\DSVD2.EXE, 138748-00A Rev 31, DSVDNetMeeting [WIN40 US] Ver 1.20 Rev 1 Ext 3 Int 1
File12=\US\PK32_B2.EXE, 138736-00A Rev 36, Programmable Keys [XXXXX US] Ver 1.10 Rev 2 Ext 2 Int 5
File13=\US\WIN40\USTELE95.EXE, 138760-00A Rev 32, Telephony Modem Support [WIN40 US] Ver 2.16 Rev 1 Ext 2 Int 1
File14=\GLOBAL\WIN40\MEDIAM.EXE, 138750-00A Rev 31, Mediamatix MPEG [WIN40 US] Ver 2.00.03 Rev 2 Ext 1 Int 1
File15=\GLOBAL\WIN40\FLASH.EXE, 138746-00A Rev 31, Intel Flash [WIN40 US] Ver 1.00 Rev 1 Ext 2 Int 1
File16=\US\WIN40\USAPPAL.EXE, 138755-00A Rev 31, Appaloosa [WIN40 US] Ver 1.20 Rev 1 Ext 6 Int 1
File17=138812-00A Rev 32, MS Internet Explorer for Win95 - APL [WIN40 US] Ver 4.00 Rev 1 Ext 1 Int 1
File18=\US\WIN40\DTM95_D2.EXE, 138739-00A Rev 31, Insight Management [WIN40 US] Ver 3.20 Rev 4 Ext 2 Int 1
File19=\US\WIN40\USFRESH.EXE, 138749-00A Rev 31, Refresh Rate, S3 DSPLY [WIN40 US] Ver 1.03.08 Rev 1 Ext 1 Int 1
File20=\US\USMONCON.EXE, 138735-00A Rev 31, Monitor Config Utility [XXXXX US] Ver 1.00 Rev 1 Ext 4 Int 1
File21=\GLOBAL\CPQNS.EXE, 138734-00A Rev 31, Compaq Network Support [XXXXX XX] Ver 1.00 Rev 11 Ext 1 Int 1
File22=\US\WIN40\USRMSPT.EXE, 138752-00A Rev 31, MS-DOS Real Mode [WIN40 US] Ver 1.00 Rev 1 Ext 3 Int 1
File23=\US\WIN40\US4WDIAG.EXE, 138742-00A Rev 31, Diagnostics For Windows [WIN40 US] Ver 1.20 Rev 2 Ext 1 Int 1
File24=\US\STREF_B4.EXE, 138730-00A Rev 34, Star T Help [XXXXX US] Ver 1.00 Rev 2 Ext 4 Int 3
File25=\US\STOPT_B1.EXE, 138731-00A Rev 34, Star T Options [XXXXX US] Ver 1.00 Rev 2 Ext 1 Int 3
File26=\US\WIN40\USSCGD4.EXE, 138743-00A Rev 31, Safety and Comfort Guide [WIN40 US] Ver 3.0 Rev 3 Ext 1 Int 1
File27=\GLOBAL\WIN40\POINTCST.EXE, 138756-00A Rev 31, Pointcast [WIN40 US] Ver 1.38 Rev 2 Ext 2 Int 1
File28=\US\WIN40\USCOLT.EXE, 138754-00A Rev 31, Colt Modem Tester [WIN40 US] Ver 1.09 Rev 1 Ext 4 Int 1

-continued

Compaq Diagnostics for Windows 2.11

File29=\US\WIN40\USPEDIT.EXE, 138761-00A Rev 31, MS Policy Editor [WIN40 US] Ver 1.00 Rev 2 Ext 1 Int 1
File30=138738-00A Rev 41, CIA TOOLS [XXXXX XX] Ver 3.01 Rev 1 Ext 2 Int 2
File31=138829-00A Rev 33, A4TOOLS [WIN40 XX] Ver 1.10 Rev 1 Ext 2 Int 2
File32=138728-00A Rev 32, Diags PC [XXXXX XX] Ver 10.19 Rev 1 Ext 2 Int 2
File33=138729-00A Rev 31, F10 Setup [XXXXX US] Ver 2.00 Rev 8 Ext 2 Int 1
File34=315650-001 Rev 100, INFO.BOM component
[US.WIN40]
Defaults=US, USA
File1=138701-00A Rev 33
File2=138703-00A Rev 31
File3=138740-00A Rev 43
File4=138757-00A Rev 31
File5=138747-00A Rev 32
File6=138745-00A Rev 32
File7=138758-00A Rev 42
File8=\US\WIN40\PWR95__B1.EXE
File9=\US\SEC32__C2.EXE
File10=\GLOBAL\WIN40\DSVD2.EXE
File11=\US\PK32__B2.EXE
File12=\US\WIN40\USTELE95.EXE
File13=\GLOBAL\WIN40\MEDIAM.EXE
File14=\GLOBAL\WIN40\FLASH.EXE
File15=\US\WIN40\USAPPAL.EXE
File16=138812-00A Rev 32
File17=\US\WIN40\DTM95__D2.EXE
File18=\US\WIN40\USFRESH.EXE
File19=\US\USMONCON.EXE
File20=\GLOBAL\CPQNS.EXE
File21=\US\WIN40\USRMSPT.EXE
File22=\US\WIN40\US4WDIAG.EXE
File23=\US\STREF__B4.EXE
File24=\US\STOPT__B1.EXE
File25=\US\WIN40\USSCGD4.EXE
File26=\GLOBAL\WIN40\POINTCST.EXE
File27=\US\WIN40\USCOLT.EXE
File28=\US\WIN40\USPEDIT.EXE
File29=138738-00A Rev 41
File30=138829-00A Rev 33
File31=138728-00A Rev 32
File32=138729-00A Rev 31
System Configuration Memory
00–0F :    42 00 07 00    10 00 06  08    09 98 26 02    50 80 00 00
10–1F :    40 F2 F0 10    03 80 02  00    3C 41 00 00    00 FF 63 00
20–2F :    00 00 00 00    7E 29 00  40    00 97 00 45    80 00 06 D9
30–3F :    00 3C 19 80    01 11 XX  XX    XX XX XX XX    XX XX XX XX
BIOS Data Area
40:0000 :    F8 03 F8 02    E8 03 00  00    78 03 00 00    00 00 13 02
40:0010 :    27 C6 01 80    02 00 00  00    00 00 1E 00    1E 00 00 00
40:0020 :    00 00 00 00    00 00 00  00    00 00 00 00    00 00 00 00
40:0030 :    00 00 00 00    00 00 00  00    00 00 00 00    00 00 01 00
40:0040 :    50 80 70 3F    01 00 00  AE    10 6D 80 00    FF FF 00 00
40:0050 :    00 00 00 00    00 00 00  00    00 00 00 00    00 00 00 00
40:0060 :    00 00 00 D4    03 29 30  E0    FF 00 20 FF    16 21 0A 00
40:0070 :    00 00 00 12    00 01 08  01    14 14 14 3C    01 01 01 01
40:0080 :    1E 00 3E 00    2F 10 00  E0    09 11 0B 01    50 00 00 01
40:0090 :    17 00 00 00    00 00 00  00    00 00 00 00    00 00 00 00
40:00A0 :    00 00 00 00    00 00 00  00    7B 28 00 C0    00 00 00 00
40:00B0 :    00 00 00 00    00 00 00  00    00 00 00 00    00 00 00 00
40:00C0 :    00 00 00 00    00 00 00  00    00 00 00 00    00 00 00 00
40:00D0 :    00 00 00 00    00 00 00  00    00 00 00 00    00 00 00 00
40:00E0 :    00 00 00 00    00 00 00  00    00 00 00 00    00 00 00 00
40:00F0 :    00 00 00 00    00 00 00  00    00 00 00 00    00 00 00 00
Interrupt Vector Table
00–03 :    00C9:000B    C0FF:F508    0F65:0016    0000:0224
04–07 :    0070:0465    F000:FF54    F000:331E    F000:9BD0
08–0B :    CC00:0000    0F65:0028    F000:9BD0    F000:9BD0
0C–0F :    F000:9BD0    F000:9BD0    0F65:009A    0070:0465
10–13 :    CC70:0007    F000:F84D    F000:F841    FD5E:2537
14–17 :    F000:E739    0254:0240    0070:042D    029D:0A28
18–1B :    F000:49C5    1026:002F    F000:FE6E    029D:0604
1C–1F :    CC00:001D    F000:F0A4    0000:0522    C000:5D06
20–23 :    00C9:0FA8    105A:042F    FCB2:2FF7    FD7B:2367
24–27 :    1148:0003    00C9:0FBC    00C9:0FC6    00C9:0FD0
28–2B :    00C9:106C    0070:0466    029D:05B4    00C9:106C
2C–2F :    00C9:106C    00C9:106C    102B:0000    105A:03F6
30–33 :    C90F:E4EA    F000:9B00    00C9:106C    113A:0001

-continued

| Compaq Diagnostics for Windows 2.11 | | | | |
|---|---|---|---|---|
| 34–37 : | 00C9:106C | 00C9:106C | 00C9:106C | 00C9:106C |
| 38–3B : | 00C9:106C | 00C9:106C | 00C9:106C | 00C9:106C |
| 3C–3F : | 00C9:106C | 00C9:106C | 00C9:106C | 00C9:106C |
| 40–43 : | F000:CEB6 | F000:E801 | F000:F065 | C000:7032 |
| 44–47 : | F000:9BD0 | F000:9BD0 | F000:E401 | F000:9BD0 |
| 48–4B : | F000:9BD0 | F000:9BD0 | F000:9BD0 | FD4C:2657 |
| 4C–4F : | F000:9BD0 | F000:9BD0 | F000:9BD0 | 0070:04FC |
| 50–53 : | F000:9BD0 | F000:9BD0 | F000:9BD0 | F000:9BD0 |
| 54–57 : | F000:9BD0 | F000:9BD0 | F000:9BD0 | F000:9BD0 |
| 58–5B : | F000:9BD0 | F000:9BD0 | F000:9BD0 | F000:9BD0 |
| 5C–5F : | 1147:000D | F000:9BD0 | F000:9BD0 | F000:9BD0 |
| 60–63 : | 0000:0000 | 0000:0000 | 0000:0000 | 0000:0000 |
| 64–67 : | 0000:0000 | 0000:0000 | 0000:0000 | 113B:0040 |
| 68–6B : | F000:9BD0 | F000:9BD0 | F000:9BD0 | F000:9BD0 |
| 6C–6F : | F000:9BD0 | C000:39E6 | F000:9BD0 | F000:9BD0 |
| 70–73 : | 0F65:0035 | F000:9C1F | F000:9BD0 | F000:9BD0 |
| 74–77 : | 0F65:00E2 | F000:9C28 | 0F65:00FA | F000:9BD0 |
| 78–7B : | 0000:0000 | 0000:0000 | 0000:0000 | 0000:0000 |
| 7C–7F : | 0000:0000 | 0000:0000 | 0000:0000 | 0000:0000 |
| 80–83 : | 0000:0000 | 0000:0000 | 0000:0000 | 0000:0000 |
| 84–87 : | 0000:0000 | 0000:0000 | 0000:0000 | 0000:0000 |
| 88–8B : | 0000:0000 | 0000:0000 | 0000:0000 | 0000:0000 |
| 8C–8F : | 0000:0000 | 0000:0000 | 0000:0000 | 0000:0000 |
| 90–93 : | 0000:0000 | 0000:0000 | 0000:0000 | 0000:0000 |
| 94–97 : | 0000:0000 | 0000:0000 | 0000:0000 | 0000:0000 |
| 98–9B : | 0000:0000 | 0000:0000 | 0000:0000 | 0000:0000 |
| 9C–9F : | 0000:0000 | 0000:0000 | 0000:0000 | 0000:0000 |
| A0–A3 : | 0000:0000 | 0000:0000 | 0000:0000 | 0000:0000 |
| A4–A7 : | 0000:0000 | 0000:0000 | 0000:0000 | 0000:0000 |
| A8–AB : | 0000:0000 | 0000:0000 | 0000:0000 | 0000:0000 |
| AC–AF : | 0000:0000 | 0000:0000 | 0000:0000 | 0000:0000 |
| B0–B3 : | 0000:0000 | 0000:0000 | 0000:0000 | 0000:0000 |
| B4–B7 : | 0000:0000 | 0000:0000 | 0000:0000 | 0000:0000 |
| B8–BB : | 0000:0000 | 0000:0000 | 0000:0000 | 0000:0000 |
| BC–BF : | 0000:0000 | 0000:0000 | 0000:0000 | 0000:0000 |
| C0–C3 : | 0000:0000 | 0000:0000 | 0000:0000 | 0000:0000 |
| C4–C7 : | 0000:0000 | 0000:0000 | 0000:0000 | 0000:0000 |
| C8–CB : | 0000:0000 | 0000:0000 | 0000:0000 | 0000:0000 |
| CC–CF : | 0000:0000 | 0000:0000 | 0000:0000 | 0000:0000 |
| D0–D3 : | 0000:0000 | 0000:0000 | 0000:0000 | 0000:0000 |
| D4–D7 : | 0000:0000 | 0000:0000 | 0000:0000 | 0000:0000 |
| D8–DB : | 0000:0000 | 0000:0000 | 0000:0000 | 0000:0000 |
| DC–DF : | 0000:0000 | 0000:0000 | 0000:0000 | 0000:0000 |
| E0–E3 : | 0000:0000 | 0000:0000 | 0000:0000 | 0000:0000 |
| E4–E7 : | 0000:0000 | 0000:0000 | 0000:0000 | 0000:0000 |
| E8–EB : | 0000:0000 | 0000:0000 | 0000:0000 | 0000:0000 |
| EC–EF : | 0000:0000 | 0000:0000 | 0000:0000 | 0000:0000 |
| F0–F3 : | 0000:0000 | 0000:0000 | 0000:0000 | 0000:0000 |
| F4–F7 : | 0000:0000 | 0000:0000 | 0000:0000 | 0000:0000 |
| F8–FB : | 0000:0000 | 0000:0000 | 0000:0000 | 0000:0000 |
| FC–FF : | 0000:0000 | 0000:0000 | 0000:0000 | 0000:0000 |
| Is System Information Table supported | Yes | | | |
| Is Desktop Management Interface supported | No | | | |

SIT Header Record
21 53 49 54
Power Conservation Record
01 11 FF 2F FB 02 01 48 01 00 88 00 22 00 00 00
B0 C4 04

| | |
|---|---|
| SIT Record Id | 1 (01h) |
| SIT Record Length | 17 (11h) |
| Is system standby supported | Yes |
| Is hard drive timeout supported | Yes |
| Is screen save supported | Yes |
| Are the power conservation beeps controllable | Yes |
| Is system idle timeout supported | Yes |
| Is hibernation supported | Yes |
| Is the processor speed configurable | Yes |
| Is the volume controllable | Yes |
| Is maximum brightness controllable | Yes |
| Is advanced power management supported | Yes |
| Are popups supported | Yes |
| Is the size of the popups changeable | No |
| Is the location of the popups changeable | Yes |
| Is desktop power management supported | No |
| Is the LED blink controllable | No |
| Can PCMCIA slot be turned off during runtime | Yes |
| Can PCMCIA slot be controlled during standby | Yes |

-continued

| Compaq Diagnostics for Windows 2.11 | |
|---|---|
| Does hibernation only occur at lowbat | No |
| Is portable AC power management supported | Yes |
| Is monitor off mode supported | Yes |
| Is AC hard drive timeout supported | Yes |
| Is AC screen save supported | Yes |
| Is software power down available | Yes |
| Is a modem installed in the option slot | No |
| Are screen save and system idle the same | No |
| Configurable processor speeds | 1 and ½ |
| Is desktop suspend state supported | No |
| Quick energy save support type | Not supported |
| SMI Offset | 0 (00h) |
| SMI Segment | 45056 (B000h) |
| Number of Batteries | 4 |
| SMI Generation scheme | Int 10 |
| Number of programmable keys | 4 |
| System Standby Timeout Record 02 12 00 01 02 03 04 05 06 07 08 09 0A 0B 0C 0D 0E 0F 10 11 | |
| SIT Record Id | 2 (02h) |
| SIT Record Length | 18 (12h) |
| Entry # 0 | 0 (00h) minute(s) |
| Entry # 1 | 1 (01h) minute(s) |
| Entry # 2 | 2 (02h) minute(s) |
| Entry # 3 | 3 (03h) minute(s) |
| Entry # 4 | 4 (04h) minute(s) |
| Entry # 5 | 5 (05h) minute(s) |
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Screen Save/Monitor Timeout Record 03 20 00 01 02 03 04 05 06 07 08 09 0A 0B 0C 0D 0E 0F 10 11 12 13 14 15 16 17 18 19 1A 1B 1C 1D 1E 1F | |
| SIT Record Id | 3 (03h) |
| SIT Record Length | 32 (20h) |
| Entry # 0 | 0 (00h) minute(s) |
| Entry # 1 | 1 (01h) minute(s) |
| Entry # 2 | 2 (02h) minute(s) |
| Entry # 3 | 3 (03h) minute(s) |
| Entry # 4 | 4 (04h) minute(s) |
| Entry # 5 | 5 (05h) minute(s) |
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Entry # 18 | 18 (12h) minute(s) |
| Entry # 19 | 19 (13h) minute(s) |
| Entry # 20 | 20 (14h) minute(s) |
| Entry # 21 | 21 (15h) minute(s) |
| Entry # 22 | 22 (16h) minute(s) |
| Entry # 23 | 23 (17h) minute(s) |
| Entry # 24 | 24 (18h) minute(s) |
| Entry # 25 | 25 (19h) minute(s) |
| Entry # 26 | 26 (1Ah) minute(s) |
| Entry # 27 | 27 (1Bh) minute(s) |
| Entry # 28 | 28 (1Ch) minute(s) |
| Entry # 29 | 29 (1Dh) minute(s) |
| Entry # 30 | 30 (1Eh) minute(s) |
| Entry # 31 | 31 (1Fh) minute(s) |

-continued

| Compaq Diagnostics for Windows 2.11 | |
|---|---|
| Hard Drive Timeout Record | |
| 04 12 00 01 02 03 04 05 06 07 08 09 0A 0B 0C 0D | |
| 0E 0F 10 11 | |
| SIT Record Id | 4 (04h) |
| SIT Record Length | 18 (12h) |
| Entry # 0 | 0 (00h) minute(s) |
| Entry # 1 | 1 (01h) minute(s) |
| Entry # 2 | 2 (02h) minute(s) |
| Entry # 3 | 3 (03h) minute(s) |
| Entry # 4 | 4 (04h) minute(s) |
| Entry # 5 | 5 (05h) minute(s) |
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Security Features Record | |
| 05 03 04 BE 78 | |
| SIT Record Id | 5 (05h) |
| SIT Record Length | 3 (03h) |
| Is diskette drive control supported | Yes |
| Is diskette drive write control supported | Yes |
| Is serial port control supported | Yes |
| Is parallel port control supported | Yes |
| Is PCMCIA slot control supported | Yes |
| Is SafeStart virus detection supported | No |
| Password type | 7 character |
| Is locking of password bytes supported | Yes |
| Allow changeable features if setup password | Yes |
| Processor/Memory/Cache Record | |
| 06 15 0A 01 07 20 00 06 10 00 90 00 00 00 00 00 | |
| 00 00 00 00 00 00 00 | |
| SIT Record Id | 6 (06h) |
| SIT Record Length | 21 (15h) |
| Processor speed | 266 MHz |
| L2 Cache | |
| Cache installed | Installed |
| Cache option | Optional/Permanent |
| Write policy | Write back |
| Size | 512 Kbytes |
| Speed | 0 ns |
| Total soldered memory | 16 MB |
| Maximum memory installable | 144 MB |
| L3 Cache | |
| Processor | |
| Cache option | Not available |
| Cache installed | Not installed |
| Write policy | Write through |
| Size | 0 Kbytes |
| Speed | 0 ns |
| Processor 2 | |
| Cache option | Not available |
| Cache installed | Not installed |
| Write policy | Write through |
| Size | 0 Kbytes |
| Speed | 0 ns |
| Processor 3 | |
| Cache option | Not available |
| Cache installed | Not installed |
| Write policy | Write through |
| Size | 0 Kbytes |
| Speed | 0 ns |
| Processor 4 | |
| Cache option | Not available |
| Cache installed | Not installed |
| Write policy | Write through |
| Size | 0 Kbytes |
| Speed | 0 ns |
| Processor designer | 0 |
| General System Peripheral and Input Device Information Record | |

-continued

| Compaq Diagnostics for Windows 2.11 | |
|---|---|
| 07 1D E7 11 82 33 33 30 35 3A 3F 04 11 00 12 1E | |
| 24 12 27 01 00 AC 00 01 00 00 01 24 13 F0 F0 | |
| SIT Record Id | 7 (07h) |
| SIT Record Length | 29 (1Dh) |
| Does ROM support F10 partition | Yes |
| Is the System ROM flashable | Yes |
| Backup copy of CMOS supported | No |
| Is on-board bootable SCSI supported | No |
| Does BIOS support hard drive DMA | Yes |
| Does system have PCMCIA capabilities | Yes |
| Does system support enhanced IDE DMA | Yes |
| Does ROM have CD-ROM boot support | Yes |
| Does system ROM have a boot block | No |
| Does ROM have embedded diagnostics | No |
| Does ROM support POST speedup feature | Yes |
| Is TV Tuner Installed | No |
| Is E1 Torito Standard CD-ROM boot available | No |
| Form Factor | Laptop notebook or sub-notebook |
| Soft drive type 65 | |
| Is soft drive type supported | Yes |
| Number of bytes of soft drive type data | 5 bytes |
| Location of soft drive type data | Extended System Configuration Memory |
| What is starting address of the data | 48 (30h) |
| Soft drive type 66 | |
| Is soft drive type supported | Yes |
| Number of bytes of soft drive type data | 5 bytes |
| Location of soft drive type data | Extended System Configuration Memory |
| What is starting address of the data | 53 (35h) |
| Soft drive type 68 | |
| Is soft drive type supported | Yes |
| Number of bytes of soft drive type data | 5 bytes |
| Location of soft drive type data | Extended System Configuration Memory |
| What is starting address of the data | 58 (3Ah) |
| Soft drive type 15 | |
| Is soft drive type supported | Yes |
| Number of bytes of soft drive type data | 5 bytes |
| Location of soft drive type data | Extended System Configuration Memory |
| What is starting address of the data | 63 (3Fh) |
| Panel ID | 4 |
| Number of software configurable serial ports | 1 |
| Is the System ROM socketed | No |
| Integrated monitor and system board | No |
| Type of special modem installed | 0 |
| Is EPP mode supported | No |
| Client Management support level | Enhanced |
| Does drive 0 support DFP | Yes |
| Does drive 1 support DFP | No |
| Doee drive 2 support DFP | No |
| Does drive 3 support DFP | No |
| PCI bus master enable/disable | |
| CMOS offset | 30 |
| Bit location | 4 |
| CMOS type | Non-Volatile RAM |
| VGA palette snoop enable/disable | |
| CMOS offset | 18 |
| Bit location | 7 |
| CMOS type | Non-Volatile RAM |
| Are multiple PCI busses supported | Yes |
| I2C I/O Address | 44032 |
| Bit position of I2C SCL Signal | 0 |
| Bit position of I2C SDA Signal | 0 |
| I2C start/stop conditions | Normal |
| ATAPI device information | |
| First logical device | Not Installed |
| Second logical device | CD-ROM Drive |
| Third logical device | Not Installed |
| Fourth logical device | Not Installed |
| 3-D audio support | |
| Audio device | Not present |
| Tone control device | Not present |
| Is Quick Boot Supported | Yes |
| Are Stick Ctrl, Alt, Shift Keys supported | No |
| Are Microsoft scan codes supported | No |
| Is power inhibit supported | No |
| Back to back I/O delay Index 0 | 61459 (F013h) |
| Back to back I/O delay Index 1 | 2288 (8F0h) |
| Memory Module Infomation Record | |

-continued

Compaq Diagnostics for Windows 2.11

| | |
|---|---|
| 08 09 02 00 00 46 03 01 10 46 03 | |
| SIT Record Id | 8 (08h) |
| SIT Record Length | 9 (09h) |
| Nunber of existing memory sockets | 2 |
| System socket number | 0 |
| Expansion board slot number | 0 |
| Amount of memory in MB | 0 MB |
| Is parity supported | No |
| System socket number | 1 |
| Expansion board slot number | 0 |
| Amount of memory in MB | 16 MB |
| Speed of memory in ns | 70 ns |
| Memory Form Factor | DIMM |
| Is parity supported | No |
| Timeout Default Value Record | |
| 09 0A 03 01 01 4B 64 05 02 03 4B 64 | |
| SIT Record Id | 9 (09h) |
| SIT Record Length | 10 (0Ah) |
| Conservation parameters when power conservation level is set to High | |
| Standby | 3 minute(s) (03h) |
| Hard drive or system idle timeout | 1 minute(s) (01h) |
| Screen save/monitor timeout | 1 minute(s) (01h) |
| Maximum brightness | 75% (4Bh) |
| Processor speed | 100% (64h) |
| Conservation parameters when power conservation level is set to Medium | |
| Standby | 5 minute(s) (05h) |
| Hard drive or system idle timeout | 2 minute(s) (02h) |
| Screen save/monitor timeout | 3 minute(s) (03h) |
| Maximum brightness | 75% (4Bh) |
| Processor speed | 100% (64h) |
| CMOS and NVRAM Information Record | |
| 0A 05 7F 00 3F 00 01 | |
| SIT Record Id | 10 (0Ah) |
| SIT Record Length | 5 (05h) |
| Number of bytes of NVRAM or ECMOS | 127 (7Fh) |
| Number of bytes of CMOS | 63 (3Fh) |
| NVRAM access type | Index:820h, Data:800h–81fh |
| Extended Disk Support Record | |
| 0E 02 A1 DE | |
| SIT Record Id | 14 (0Eh) |
| SIT Record Length | 2 (02h) |
| Pointer to extended disk table | 56993 |
| Product Name Header Record | |
| 10 0E 41 72 6D 61 64 61 20 37 37 39 32 44 4D 00 | |
| SIT Record Id | 16 (10h) |
| SIT Record Length | 14 (0Eh) |
| Product Name (Driver) | Armada 7792DM |
| Version information for Compaq Diagnostics for Windows | |
| CPQDIAG.EXE | 8/26/98 9:50:34 AM |
| DL_DISK.DLL | 8/26/98 10:04:00 AM |
| DL_SCSI.DLL | 8/26/98 10:04:10 AM |
| DL_PAR.DLL | 8/26/98 10:04:10 AM |
| DL_SER.DLL | 8/26/98 10:04:12 AM |
| DL_AUDIO.DLL | 8/26/98 10:03:58 AM |
| DL_CPU.DLL | 8/26/98 10:04:00 AM |
| DL_INPUT.DLL | 8/26/98 10:04:02 AM |
| DL_MODEM.DLL | 8/26/98 10:04:06 AM |
| DL_VIDEO.DLL | 8/26/98 10:04:14 AM |
| DL_MEM.DLL | 8/26/98 10:04:04 AM |

Further features which are contemplated as advantageous with the presently disclosed innovations are described in copending U.S. application Ser. No. 09/429,681, filed on Oct. 28, 1999, which is owned in common with the present application and has the same filing date as the present application, and which is hereby incorporated by reference.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

Hardware: the physical, tangible components of a computer system.

Operating system: a set of programs controlling the operations of a computer system, such as assemblers or input and output facilities.

Configuration: the collection of internal settings that controls how hardware and software function.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In a preferred embodiment, the presently disclosed innovation is used on a computer running any of the Windows 95/98/NT/2000 operating systems. Any other operating system may be used with the present innovations.

The base and current computer hardware and operating system information is captured in ASCII text files using Compaq Diagnostics for Windows. Storage of the data in any format is within the contemplation of the invention.

The design builds on Compaq Diagnostics for Windows. However, any diagnostics program could be the foundation for the presently disclosed innovations.

The diagnostics program can be an operating system level program, or embedded diagnostics can be used.

The hardware and operating system configurations may be gathered more frequently than only at program installation and program execution. For instance, each time the hardware or operating system undergoes any configuration change, the new configuration is captured and recorded as an ASCII text file. Or, the system may run cpdiaga.exe at each startup, recording configuration changes. In embodiments where there are many sets of configurations stored, each configuration is time stamped so as to preserve a complete chronological record of configuration settings for the computer. Additionally, in embodiments that record configuration more frequently, each time current configurations are recorded, the configurations could automatically be compared with the previous configurations, and only the changes captured in ASCII text files.

Information other than just hardware and operating system configurations can be captured by the program. Any readable information accessible to the program, be it an operating system level diagnostics program or an embedded diagnostics program, may be captured and used as a service tool. Software and DLL (Dynamic Link Library) versions could be checked. Anything stored in the Windows Registry or in any directory may also be accessed and used in servicing computers.

The amount of processing of the configuration data done by the diagnostics application can vary. The diagnostics application can merely gather and relay the configuration information, or it could perform some comparison. It could also filter the data, sending only the changes in configuration, or only send data about certain hardware or software.

Comparison and other processing of configuration data could occur at the user's computer locally, or it could be done remotely by a computer at the customer service site.

The program can prompt the user for input regarding the problem, or the data could automatically be sent without user input. Additionally, only the user input information might be sent, with or without the configuration data. These options can be made available as user selected options, or they may be made automatic so that the user need not initiate them.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

Additional general background, which helps to show the knowl-edge of those skilled in the art regarding the system context, and of variations and options for implementations, may be found in the following publications, all of which are hereby incorporated by reference. In particular, many details may be found in the books from MindShare, Inc., including PROTECTED MODE SOFTWARE ARCHITECTURE, CARDBUS SYSTEM ARCHITECTURE, EISA SYSTEM ARCHITECTURE, ISA SYSTEM ARCHITECTURE, 80486 SYSTEM ARCHITECTURE, PENTIUM PROCESSOR SYSTEM ARCHITECTURE, PCMCIA SYSTEM ARCHITECTURE, PLUG AND PLAY SYSTEM ARCHITECTURE, PCI SYSTEM ARCHITECTURE, USB SYSTEM ARCHITECTURE, and PENTIUM PRO PROCESSOR SYSTEM ARCHITECTURE, all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

What is claimed is:

1. A method of servicing a computer, the computer including hardware and an operating system, comprising the steps of:

capturing base configuration data for the computer;

capturing the current configuration data; and automatically comparing the base and current configuration data, wherein the base configuration data is captured and stored more than once before current configuration data is captured.

2. The method of claim 1, wherein the base configuration data and the current configuration data relates to the hardware and operating system of the computer.

3. The method of claim 1, wherein the base configuration data and the current configuration data areis stored as an ASCII text file.

4. The method of claim 1, wherein the base data is captured by a diagnostics program on the computer at the time the diagnostics program is installed.

5. The method of claim 1, further comprising the step of highlighting the differences between the base and the current configuration data.

6. The method of claim 1, wherein the step of comparing is done at the computer.

7. The method of claim 1, wherein the base configuration data and the current configuration data includes information on the computer's memory.

8. A method of servicing a computer, comprising the steps of:

when there is a problem with the computer, running a diagnostic program that captures the configuration data of hardware and operating system on the computer;

comparing the configuration data with a base set of configuration data; and sending configuration data to a remote computer, wherein multiple sets of configuration data are captured and compared to each other and the base configuration.

9. The method of claim 8, wherein the comparison is used to service the computer.

10. The method of claim 8, further comprising the step of highlighting the differences between the base and current configuration data.

11. The method of claim 8, wherein all sets of configuration data are time stamped.

12. A software and hardware diagnostics architecture for a computer, comprising:

a diagnostics program installed on the computer capable of capturing configuration data from the computer, wherein, the program captures multiple base sets of configuration data, and later captures a current set of configuration data for comparison to the base sets of configuration data, the comparison used to service the computer.

13. The architecture of claim 12, wherein the base sets and current set of configuration data relates to hardware and operating system settings on the computer.

14. The architecture of claim 12, wherein the diagnostics program captures the base sets of configuration data on installation and on at least one other occasion.

15. The architecture of claim 12, wherein differences between the base and the current configuration data are highlighted.

16. The architecture of claim 12, wherein the base and the current configuration data are stored in ASCII text files.

17. The architecture of claim 12, wherein the base sets and the current set of configuration data captured is any data in the computer associated with at least one of: asset control, input devices, communication, storage, video, memory, multimedia, the operating system, architecture, computer health, modification information, BIOS data, system configuration memory, interrupt vector table, a power conversion record, a system standby timeout record, a screen saver record, a hard drive timeout record, a security features record, a processor/memory/cache record, a general system peripheral and input device information record, a timeout default value record, an extended disk support record, and a product name header record.

18. A computer, comprising:

a diagnostics program installed on the computer capable of capturing current configuration data from the computer;

stored base configuration data for the computer, wherein the base configuration data comprises data captured during multiple time intervals before the current configuration data is captured;

wherein the current configuration data is compared to the base configuration data.

19. The computer of claim 18, wherein the base configuration data and the current configuration data relates to hardware and operating system settings on the computer.

20. The computer of claim 18, wherein a program other than the diagnostics program compares the base and the current configuration data.

21. The computer of claim 18, wherein part of the base configuration data is captured when the diagnostics program is installed.

22. The computer of claim 18, wherein the differences between the base and the current configuration data are highlighted.

* * * * *